(12) United States Patent
Kim et al.

(10) Patent No.: US 12,209,216 B2
(45) Date of Patent: Jan. 28, 2025

(54) DISPLAY DEVICE INCLUDING TRANSMITTANCE CONTROL DISPLAY

(71) Applicant: ELECTRONICS AND TELECOMMUNICATIONS RESEARCH INSTITUTE, Daejeon (KR)

(72) Inventors: Gi Heon Kim, Daejeon (KR); Won Jae Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 18/318,969

(22) Filed: May 17, 2023

(65) Prior Publication Data

US 2024/0084197 A1  Mar. 14, 2024

(30) Foreign Application Priority Data

Aug. 19, 2022  (KR) .......................... 10-2022-0104148

(51) Int. Cl.
*G02F 1/1333* (2006.01)
*C09K 19/54* (2006.01)
*C09K 19/60* (2006.01)
*G02F 1/1343* (2006.01)
*G02F 1/139* (2006.01)

(52) U.S. Cl.
CPC .......... *C09K 19/601* (2013.01); *C09K 19/544* (2013.01); *G02F 1/133345* (2013.01); *G02F 1/134309* (2013.01); *G02F 1/139* (2013.01); *G02F 2202/04* (2013.01)

(58) Field of Classification Search
CPC . G02F 1/1333; G02F 1/133345; C09K 19/54; C09K 19/60; C09K 19/601
See application file for complete search history.

(56) References Cited

U.S. PATENT DOCUMENTS

| 10,073,315 | B2 | 9/2018 | Kim et al. | |
| 10,156,760 | B2 | 12/2018 | Kim et al. | |
| 11,236,271 | B2 | 2/2022 | Song et al. | |
| 2010/0055353 | A1 | 3/2010 | Cho et al. | |
| 2013/0092874 | A1 | 4/2013 | Bacher et al. | |
| 2024/0084197 | A1* | 3/2024 | Kim | G02F 1/133345 |
| 2024/0176222 | A1* | 5/2024 | Kim | G03B 21/62 |

FOREIGN PATENT DOCUMENTS

| KR | 10-2009-0004771 A | 1/2009 | |
| KR | 10-2009-0100920 A | 9/2009 | |
| KR | 10-2013-0113418 A | 10/2013 | |
| KR | 10-2014-0024642 A | 3/2014 | |
| KR | 10-2014-0085972 A | 7/2014 | |
| KR | 10-2019-0046903 A | 5/2019 | |
| KR | 10-2001609 B1 | 7/2019 | |
| KR | 10-2150329 B1 | 9/2020 | |
| KR | 10-2021-0098576 A | 8/2021 | |
| WO | WO-2011068365 A2 * | 6/2011 | ........... C09K 19/544 |

* cited by examiner

*Primary Examiner* — Geraldina Visconti (57) ABSTRACT

Provided is a display device including a first display, the first display includes a first substrate, a first electrode on the first substrate, a second electrode on the first electrode, a second substrate on the second electrode, and a liquid crystal layer disposed between the first electrode and the second electrode, the liquid crystal layer includes a liquid crystal and a black dye, and the black dye includes at least one of a first black dye, a second black dye, and a third black dye. The first black dye is a compound in which three naphthalene rings are connected via two azo groups, the second black dye is a compound in which two naphthalene rings and one aromatic group are connected via two azo groups, and the third black dye is a compound in which three naphthalene rings and one aromatic group are connected via three azo groups.

15 Claims, 2 Drawing Sheets

DISPLAY DEVICE INCLUDING TRANSMITTANCE CONTROL DISPLAY

CROSS-REFERENCE TO RELATED APPLICATIONS

This U.S. non-provisional patent application claims priority under 35 U.S.C. § 119 of Korean Patent Application No. 10-2022-0104148, filed on Aug. 19, 2022, the entire contents of which are hereby incorporated by reference.

BACKGROUND

The present disclosure herein relates to a display device, and more particularly, to a display device including a transparent display and a transmittance control display.

With the development of modern society into an advanced information society, the importance of display industries is increasing. Recently, as the size of a screen increases and the thickness of the screen decreases, a flat panel display (FPD) such as a liquid crystal display (LCD), a plasma display panel (PDP), an organic light emitting display (OLED) is widely used. Recently, a transparent display realizes a transparent output electronic device to solve spatial/visual limitations of typical electronic devices, and is thus being spotlighted.

SUMMARY

The present disclosure provides a display device having improved visibility.

The present disclosure also provides a display device capable of achieving high transparency without using a polarizing plate.

An embodiment of the inventive concept provides a display device including a first display, the first display includes a first substrate, a first electrode on the first substrate, a second electrode on the first electrode, a second substrate on the second electrode, and a liquid crystal layer disposed between the first electrode and the second electrode, the liquid crystal layer includes a liquid crystal and a black dye, the black dye includes at least one of a first black dye, a second black dye, or a third black dye, the first black dye is a compound in which three naphthalene rings are connected via two azo groups, the second black dye is a compound in which two naphthalene rings and one aromatic group are connected via two azo groups, and the third black dye is a compound in which three naphthalene rings and one aromatic group are connected via three azo groups.

In an embodiment, the first black dye may be represented by Formula 1, 2, or 3.

Formula 1

Formula 2

Formula 3 where, in Formula 1, 2, and 3, $R_1$, $R_2$, $R_3$, $R_4$, and $R_5$ may be each independently —H, —$CH_3$, —$C_2H_5$, —$C_3H_7$, —$C_4H_9$, $C_5H_{11}$, a linear alkyl group having 6 to 8 carbon atoms, or a branched alkyl group having 3 to 8 carbon atoms.

In an embodiment, the second black dye may be represented by Formula 4, 5, or 6:

Formula 4

Formula 5

Formula 6 where, in Formulas 4, 5, and 6, $R_6$, $R_7$, $R_8$, $R_9$, and $R_{10}$ may be each independently —H, —$CH_3$, —$C_2H_5$, —$C_3H_7$, —$C_4H_9$, $C_5H_{11}$, a linear alkyl group having 6 to 8 carbon atoms, or a branched alkyl group having 3 to 8 carbon atoms.

In an embodiment, the third black dye may be represented by Formula 7, or 8:

Formula 7

-continued

Formula 8 where, in Formulas 7 and 8, $R_{11}$ and $R_{12}$ may be each independently —H, —$CH_3$, —$C_2H_5$, —$C_3H_7$, —$C_4H_9$, $C_5H_{11}$, a linear alkyl group having 6 to 8 carbon atoms, or a branched alkyl group having 3 to 8 carbon atoms.

In an embodiment, the display device may further include a second display on the first display, the second display may be a transparent display.

In an embodiment, the liquid crystal layer may further include a reactive initiator, an acrylic monomer, and a urethane-acrylic oligomer.

In an embodiment, an amount of the black dye may be about 0.01 wt % to about 10 wt % with respect to the liquid crystal.

In an embodiment, the display device may further include a first insulating layer between the first electrode and the liquid crystal layer, and a second insulating layer between the second electrode and the liquid crystal layer.

In an embodiment of the inventive concept, a display device includes a first display, and a second display on the first display, the first display includes a first substrate, a first electrode on the first substrate, a second electrode on the first electrode, a second substrate on the second electrode, and a liquid crystal layer disposed between the first electrode and the second electrode, the liquid crystal layer includes a liquid crystal, a yellow dye, a magenta dye and a cyan dye, the yellow dye is a compound in which two aromatic rings are connected via an azo group, and the yellow dye, the magenta dye, and the cyan dye are mixed to form a black color.

In an embodiment, the yellow dye may be represented by Formula 9.

Formula 9 wherein, in Formula 9, $R_{13}$ may be —$N(CH_3)_2$, —$N(C_2H_5)_2$, or —$N(X)_2$, X is an alkyl chain having 3 to 10 carbon atoms, and $R_{14}$ is —H, —$CH_3$, —$C_2H_5$, a linear alkyl group having 3 to 10 carbon atoms, a branched alkyl group having 3 to 10 carbon atoms, a linear alkene group having 3 to 10 carbon atoms, a branched alkene group having 3 to 10 carbon atoms, or at least one aromatic group.

In an embodiment, the magenta dye may be represented by Formula 10.

Formula 10 where, in Formula 10, $R_{16}$ and $R_{17}$ may be each independently —H, —$CH_3$, —$C_2H_5$, a linear alkyl group having 3 to 10 carbon atoms, a branched alkyl group having 3 to 10 carbon atoms, a linear alkene group having 3 to 10 carbon atoms, a branched alkene group having 3 to 10 carbon atoms, or at least one aromatic group, and $R_{15}$ may be a compound represented by Formula 10-1, 10,2, 10-3, or 10-4.

Formula 10-1 where, in Formula 10-1, one of $M_1$, $M_2$, $M_3$, and $M_4$ may be —OH, and the others may be —H.

Formula 10-2 where, in Formula 10-2, one of $M_5$, $M_6$, and $M_7$ may be —OH, and the others may be —H.

Formula 10-3 where, in Formula 10-3, one of $M_8$, $M_9$, $M_{10}$, and $M_{11}$ may be —OH, and the others may be —H.

Formula 10-4

In an embodiment, the cyan dye may be represented by Formula 11.

Formula 11 where, in Formula 11, $R_{18}$ and $R_{19}$ may be each independently O, S, Se, $CH_2$, NH, or ester, and Y and Z may be each independently —H, —$CH_3$, —$C_2H_5$, a linear alkyl group having 3 to 10 carbon atoms, a branched alkyl group having 3 to 10 carbon atoms, a linear alkene group having 3 to 10 carbon atoms, a branched alkene group having 3 to 10 carbon atoms, or at least one aromatic group.

In an embodiment, the second display may be a transparent display.

In an embodiment, the liquid crystal layer may further include a reactive initiator, an acrylic monomer, and a urethane-acrylic oligomer.

In an embodiment, a ratio of the magenta dye to the cyan dye may be about 1:2 to about 1:4, and a ratio of the yellow dye to the cyan dye may be about 1:6 to about 1:9.

In an embodiment, a ratio of the magenta dye to the cyan dye may be about 1:2 to about 1:3, and a ratio of the yellow dye to the cyan dye is about 1:7 to about 1:8.

In an embodiment, the display device may further include a first insulating layer between the first electrode and the liquid crystal layer, and a second insulating layer between the second electrode and the liquid crystal layer.

BRIEF DESCRIPTION OF THE FIGURES

The accompanying drawings are included to provide a further understanding of the inventive concept, and are incorporated in and constitute a part of this specification. The drawings illustrate embodiments of the inventive concept and, together with the description, serve to explain principles of the inventive concept. In the drawings.

DETAILED DESCRIPTION

In order to facilitate a sufficient understanding of the configuration and effects of the present invention, preferred embodiments of the present invention will be described with reference to the accompanying drawings. However, the present invention is not limited to the embodiments set forth below, and may be embodied in various forms and modified in many alternate forms. Rather, these embodiments are provided so that this disclosure will be thorough and complete, and will fully convey the scope of the present invention to those skilled in the art to which the present invention pertains. Those skilled in the art will understand that the concepts of the present invention may be performed in any suitable environment.

The terminology used herein is for the purpose of describing embodiments only and is not intended to be limiting of the invention. As used herein, the singular forms are intended to include the plural forms as well, unless the context clearly indicates otherwise. It will be further understood that the terms "comprises" and/or "comprising", when used in this specification, specify the presence of components, steps, operations, and/or elements, but do not preclude the presence or addition of one or more other components, steps, operations, and/or elements.

In the present disclosure, when a film (or layer) is referred to as being on another film (or layer) or substrate, it means that the film may be directly formed on another film (or layer) or substrate, or that a third film (or layer) may be interposed therebetween.

Although the terms first, second, third, and the like are used in various embodiments of the present disclosure to describe various regions, films (or layers), and the like, these regions, and films, should not be limited by these terms. These terms are only used to distinguish any predetermined region or film (or layer) from another region or film (or layer). Thus, a film referred to as a first film in one embodiment may be referred to as a second film in another embodiment. Each embodiment described and exemplified herein also includes a complementary embodiment thereof. Like numbers refer to like elements throughout the specification.

Unless otherwise defined, all terms used herein have the same meaning as commonly understood by one of ordinary skill in the art to which this invention belongs.

Hereinafter, embodiments of the inventive concept will be explained in detail with reference to the accompanying drawings.

Figure 1:
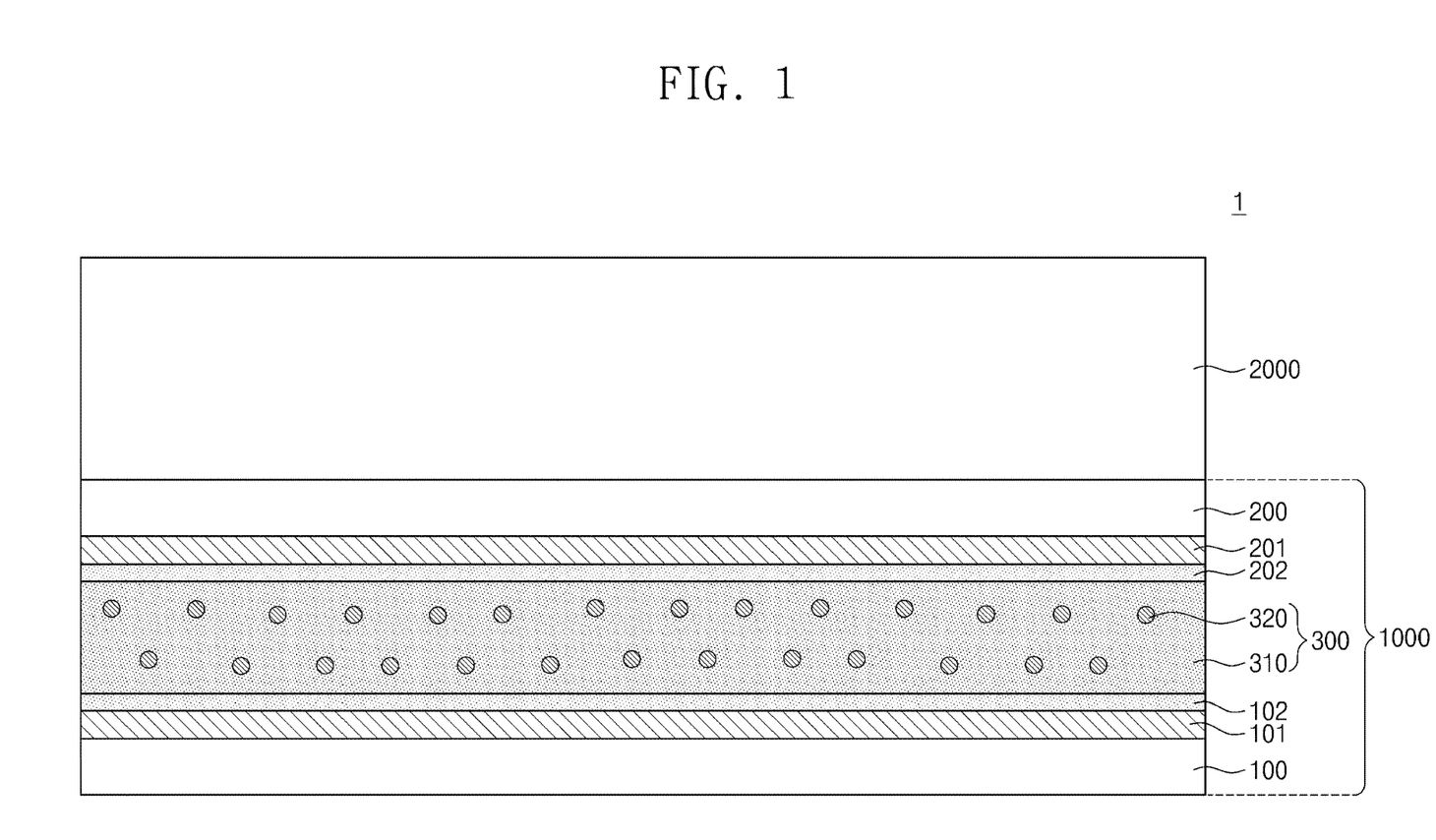
FIG. 1 is a conceptual view of a display device according to an embodiment of the inventive concept.

FIG. 1 is a conceptual view of a display device according to an embodiment of the inventive concept.

Referring to FIG. 1, a display device 1 may include a first display 1000 and a second display 2000. The display 1000 may be a transmittance control display. The first display 1000 may include a first substrate 100, a first electrode 101, a second electrode 201, a second substrate 200, and a liquid crystal layer 300.

The first electrode 101 may be provided on the first substrate 100. The first substrate 100 may be transparent. The first substrate 100 may include glass or plastic. The first electrode 101 may be transparent. The first electrode 101 may include a conductive material. As an example, the first electrode 101 may include an admixture form including at least one of indium tin oxide (ITO), indium zinc oxide (IZO), a silver nanowire, a carbon nanotube (CNT), graphene, poly(3,4-ethylenedioxythiophene) polystyrene sulfonate (PEDOT:PSS), polyaniline, or polythiophene. Preferably, the first electrode 101 may be indium tin oxide (ITO). The first electrode 101 may be formed without performing a separate patterning process.

The second electrode 201 may be provided to face the first electrode 101 with a distance therebetween. The second substrate 200 may be provided on the second electrode 201. The second electrode 201 may be provided on one surface of the second substrate 200, facing the first substrate 100. The first electrode 101 may be provided on one surface of the first substrate 100, the surface facing the second substrate 200. The second substrate 200 may be transparent. The second substrate 200 may include a substantially same material as a material of the first substrate 100. The second electrode 201 may be transparent. The second electrode 201 may include a substantially same material as a material of the first electrode 101. The second electrode 201 may be formed without performing a separate patterning process.

The liquid crystal layer 300 may be disposed between the first electrode 101 and the second electrode 201. The liquid crystal layer 300 may include a liquid crystal 310 and a black dye 320. As an example, the liquid crystal 310 may have a permittivity (Δe) of a positive (+) value. As another example, the liquid crystal 310 may have a permittivity (Δe) of a negative (−) value.

The black dye 320 may be miscible with the liquid crystal 310. The black dye 320 may be dispersed in the liquid crystal 310. An amount of the black dye 320 may be about 0.01 wt % to about 10 wt % with respect to the liquid crystal 310. The black dye 320 may have an aromatic ring and/or a condensed ring. The aromatic ring and/or the condensed ring of the black dye 320 may improve solubility in the liquid crystal 310. In addition, the aromatic ring and/or the condensed ring of the black dye 320 may improve the dispersion stability of the black dye 320 dispersed in the liquid crystal 310. An orientation of the black dye 320 may be changed by an electric field. The black dye 320 may include at least one of a first black dye, a second black dye, or a third black dye.

The first black dye may include a compound in which three naphthalene rings are connected via two azo groups. As an example, the first black dye may include a compound represented by Formula 1 below.

Formula 1 where, in Formula 1, $R_1$ may be —H, —CH$_3$, —C$_2$H$_5$, —C$_3$H$_7$, —C$_4$H$_9$, C$_5$H$_{11}$, a linear alkyl group having 6 to 8 carbon atoms, or a branched alkyl group having 3 to 8 carbon atoms.

As another example, the first black dye may include a compound represented by Formula 2.

Formula 2 where, in Formula 2, $R_2$ may be —H, —CH$_3$, —C$_2$H$_5$, —C$_3$H$_7$, —C$_4$H$_9$, C$_5$H$_{11}$, a linear alkyl group having 6 to 8 carbon atoms, or a branched alkyl group having 3 to 8 carbon atoms.

As another example, the first black dye may include a compound represented by Formula 3.

Formula 3 where, in Formula 3, $R_3$, $R_4$ and $R_5$ may be each independently —H, —CH$_3$, —C$_2$H$_5$, —C$_3$H$_7$, —C$_4$H$_9$, C$_5$H$_{11}$, a linear alkyl group having 6 to 8 carbon atoms, or a branched alkyl group having 3 to 8 carbon atoms.

The second black dye may include a compound in which two naphthalene rings and one aromatic group are connected via two azo groups. As an example, the second black dye may include a compound represented by Formula 4 below.

Formula 4 where, in Formula 4, $R_6$, $R_7$ and $R_8$ may be each independently —H, —CH$_3$, —C$_2$H$_5$, —C$_3$H$_7$, —C$_4$H$_9$, C$_5$H$_{11}$, a linear alkyl group having 6 to 8 carbon atoms, or a branched alkyl group having 3 to 8 carbon atoms.

As another example, the second black dye may include a compound represented by Formula 5 below.

Formula 5 where, in Formula 5, $R_9$ may be —H, —CH$_3$, —C$_2$H$_5$, —C$_3$H$_7$, —C$_4$H$_9$, C$_5$H$_{11}$, a linear alkyl group having 6 to 8 carbon atoms, or a branched alkyl group having 3 to 8 carbon atoms.

As another example, the second black dye may include a compound represented by Formula 6 below.

Formula 6 where, in Formula 6, $R_{10}$ may be —H, —CH$_3$, —C$_2$H$_5$, —C$_3$H$_7$, —C$_4$H$_9$, C$_5$H$_{11}$, a linear alkyl group having 6 to 8 carbon atoms, or a branched alkyl group having 3 to 8 carbon atoms.

The third black dye may include a compound in which three naphthalene rings and one aromatic group are connected via three azo groups. As an example, the third black dye may include a compound represented by Formula 7 below.

Formula 7 where, in Formula 7, $R_{11}$ may be —H, —CH$_3$, —C$_2$H$_5$, —C$_3$H$_7$, —C$_4$H$_9$, C$_5$H$_{11}$, a linear alkyl group having 6 to 8 carbon atoms, or a branched alkyl group having 3 to 8 carbon atoms.

As another example, the third black dye may include a compound represented by Formula 8 below.

Formula 8 where, in Formula 8, $R_{12}$ may be —H, —CH$_3$, —C$_2$H$_5$, —C$_3$H$_7$, —C$_4$H$_9$, C$_5$H$_{11}$, a linear alkyl group having 6 to 8 carbon atoms, or a branched alkyl group having 3 to 8 carbon atoms.

The liquid crystal layer 300 may further include a reactive initiator, an acrylic monomer, and a urethane-acrylic oligomer. As an example, the liquid crystal layer 300 may be a polymer dispersed liquid crystal (PDLC).

The first display 1000 may further include a first insulating layer 102 between the first electrode 101 and the liquid crystal layer 300. The first insulating layer 102 may be transparent. The first insulating layer 102 may include an organic material and/or an inorganic material. As an example, the organic material may include at least one polymer compound including at least one of polyimide, polyacrylate, epoxy, polyvinyl alcohol, parylene, polystyrene, polyacetate, polyvinylpyrrolidone, a fluorine-based polymer, polyvinyl chloride, or a repeating unit thereof. As an example, the inorganic material may include at least one polymer compound including at least one of silicon oxide (SiO), silicon nitride (SiN), silicon oxynitride (SiON), silicon carbide (SiC), silicon oxycarbide (SiOC) or a repeating unit thereof. The first insulating layer 102 may be provided for short-circuit protection of the liquid crystal 310 or alignment of the liquid crystal 310 in the liquid crystal layer 300.

The first display 1000 may further include a second insulating layer 202 between the second electrode 201 and the liquid crystal layer 300. The second insulating layer 202 may be transparent. The second insulating layer 202 may include a substantially same material as a material of the first insulating layer 102. The second insulating layer 202 may be provided for short-circuit protection of the liquid crystal 310 or alignment of the liquid crystal 310 in the liquid crystal layer 300.

The second display 2000 may be provided on the first display 1000. An adhesive (not illustrated) or an adhesive tape (not illustrated) may be further provided between the first display 1000 and the second display 2000. The second display 2000 may be a transparent display. As an example, the second display 2000 may be a polymer dispersed liquid crystal display, which does not use a liquid crystal display (LCD), an organic light-emitting diode (OLED) display, or a color filter, or may be a polymer dispersed liquid crystal display, which does not use a polarizing plate. As another example, the second display 2000 may be provided on a bottom surface of the first display 1000 (not illustrated).

Figure 2:
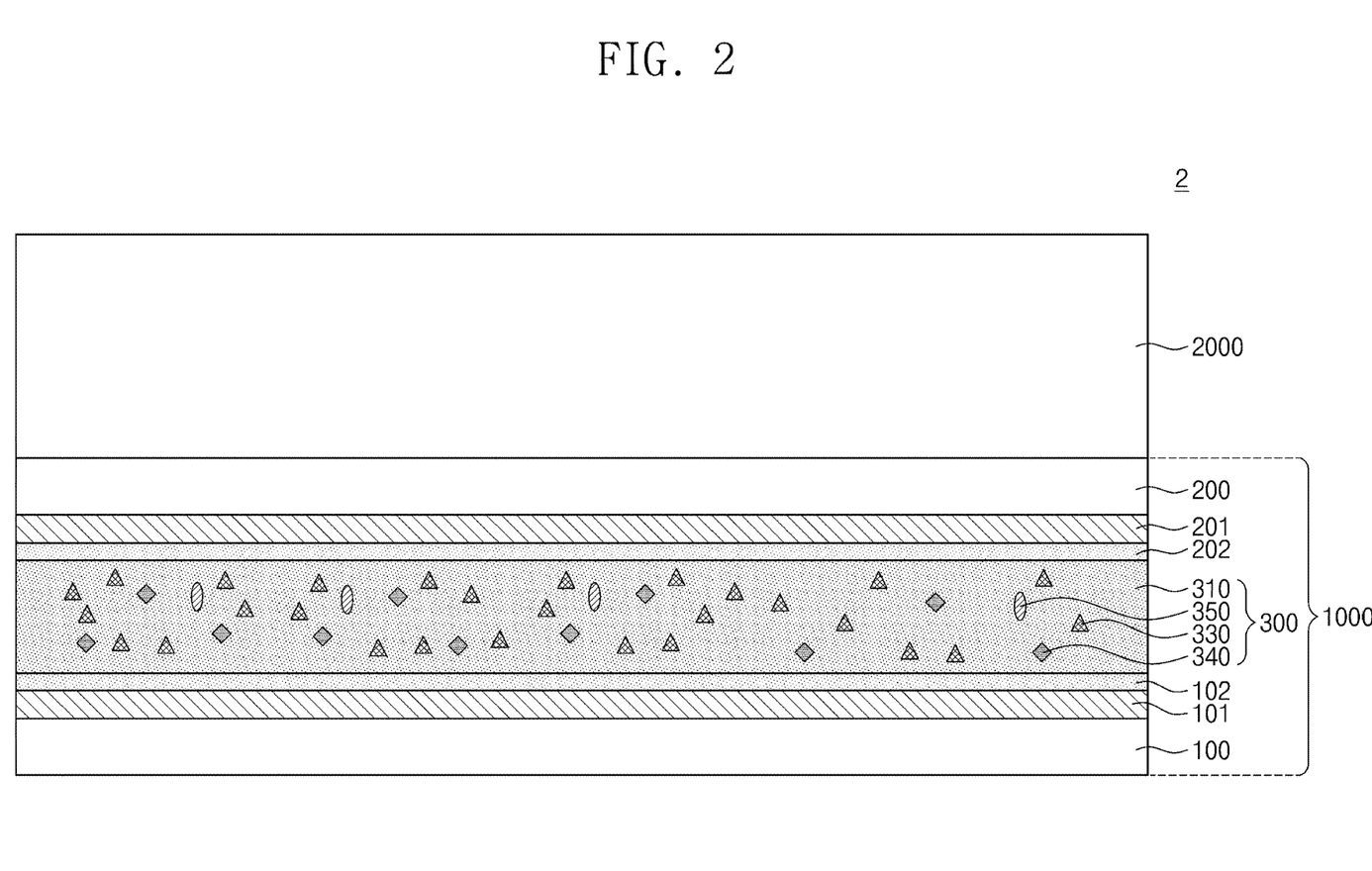
FIG. 2 is a conceptual view of a display device according to another embodiment of the inventive concept.

FIG. 2 is a conceptual view of a display device according to another embodiment of the inventive concept.

Referring to FIG. 2, a display device 2 may include a first display 1000 and a second display 2000. The first display 1000 may include a first substrate 100, a first electrode 101, a second electrode 201, a second substrate 200, and a liquid crystal layer 300. Hereinafter, duplicate contents as described above are omitted.

The liquid crystal layer 300 may include a liquid crystal 310, a yellow dye 330, a magenta dye 340, and a cyan dye 350. The yellow dye 330, the magenta dye 340, and the cyan dye 350 may be miscible with the liquid crystal. The yellow dye 330, the magenta dye 340, and the cyan dye 350 may be dispersed in the liquid crystal 310. The yellow dye 330, the magenta dye 340, and the cyan dye 350 may be mixed to form a black color. Orientations of the yellow dye 330, the magenta dye 340, and the cyan dye 350 may be changed by an electric field. In the liquid crystal 310, a ratio of the magenta dye 340 to the cyan dye 350 may be about 1:2 to about 1:4. and a ratio of the yellow dye 330 to the cyan dye 350 may be about 1:6 to about 1:9. Preferably, in the liquid crystal 310, a ratio of the magenta dye 340 to the cyan dye 350 may be about 1:2 to about 1:3, and a ratio of the yellow dye 330 to the cyan dye 350 may be about 1:7 to about 1:8. The yellow dye 330, the magenta dye 340, and the cyan dye 350 may each be included in an amount of about 0.01 wt % to about 5.0 wt % with respect to the liquid crystal 310.

The yellow dye 330 may include a compound in which two aromatic rings are connected via an azo group. As an example, the yellow dye 330 may include a compound represented by Formula 9 below.

Formula 9 where, in Formula 9, $R_{13}$ may be —$N(CH_3)_2$, —$N(C_2H_5)_2$, or —$N(X)_2$, X may be an alkyl chain having 3 to 10 carbon atoms, and $R_{14}$ is —H, —$CH_3$, —$C_2H_5$, a linear alkyl group having 3 to 10 carbon atoms, a branched alkyl group having 3 to 10 carbon atoms, a linear alkene group having 3 to 10 carbon atoms, a branched alkene group having 3 to 10 carbon atoms, or at least one aromatic group.

As an example, the magenta dye 340 may include a compound represented by Formula 10 below.

Formula 10 where, in Formula 10, $R_{16}$ and $R_{17}$ are each independently —H, —$CH_3$, —$C_2H_5$, a linear alkyl group having 3 to 10 carbon atoms, a branched alkyl group having 3 to 10 carbon atoms, a linear alkene group having 3 to 10 carbon atoms, a branched alkene group having 3 to 10 carbon atoms, or at least one aromatic group.

In Formula 10, $R_{15}$ may be represented by one of Formulas 10-1, 10-2, 10-3, and 10-4 below.

Formula 10-1 where, in Formula 10-1, one of $M_1$, $M_2$, $M_3$, and $M_4$ may be —OH, and the others

Formula 10-2 where, in Formula 10-2, one of $M_5$, $M_6$, and $M_7$ may be —OH, and the others may be —H.

Formula 10-3 where, in Formula 10-3, one of $M_8$, $M_9$, $M_{10}$, and $M_{11}$ may be —OH, and the others may be —H.

Formula 10-4

As an example, the cyan dye 350 may include a compound represented by Formula 11 below.

Formula 11 where, in Formula 11, $R_{18}$ and $R_{19}$ may be each independently O, S, Se, $CH_2$, NH, or ester, and Y and Z may be each independently —H, —$CH_3$, —$C_2H_5$, a linear alkyl group having 3 to 10 carbon atoms, a branched alkyl group having 3 to 10 carbon atoms, a linear alkene group having 3 to 10 carbon atoms, a branched alkene group having 3 to 10 carbon atoms, or at least one aromatic group.

A transmittance control display according to embodiments of the inventive concept may have a variable transmittance range of about 10% to about 90%. In addition, a display device may provide the transmittance control display on a transparent display, and thus may not include a polarizing film and/or a color filter. Therefore, the display device may have improved luminance efficiency, convert transmittance at high speed, and have high transparency. As a result, a display device having improved visibility may be provided. Furthermore, in an embodiment of the inventive concept, a black dye, a yellow dye, a magenta dye, and a cyan dye have high miscibility and dichroism, and thus, even if small amounts are added to a liquid crystal, a contrast ratio may be easily adjusted. Therefore, a display device capable of being operated at low voltage may be provided.

According to embodiments of the inventive concept, a display device provides a transmittance control display on a transparent display, and thus may not include a polarizing film and/or a color filter, thereby having improved visibility and providing high transparency.

According to embodiments of the inventive concept, a display device may easily adjust a contrast ratio by adding small amounts of dyes to a liquid crystal, and may be operated at low voltage.

Hitherto, although the present invention has been described with reference to the accompanying drawings, it is understood that various changes and modifications can be made by one ordinary skilled in the art within the spirit and scope of the present invention, set forth in the claims below. In addition, the embodiments disclosed in the present invention are not intended to limit the technical spirit of the present invention, and all technical concepts within the scope of the following claims and their equivalents should be construed as being included in the scope of the present invention.

What is claimed is:

1. A display device comprising a first display, wherein the first display includes:
   a first substrate;
   a first electrode on the first substrate;
   a second electrode on the first electrode;
   a second substrate on the second electrode; and
   a liquid crystal layer disposed between the first electrode and the second electrode,
   the liquid crystal layer includes a liquid crystal and a black dye,
   the black dye includes at least one a first black dye, a second black dye, or a third black dye,
   the first black dye is a compound in which three naphthalene rings are connected via two azo groups,
   the second black dye is a compound in which two naphthalene rings and one aromatic group are connected via two azo groups, and
   the third black dye is a compound in which three naphthalene rings and one aromatic group are connected via three azo groups,
   wherein the second black dye is represented by Formula 5 or 6:

Formula 5

Formula 6 where, in Formulas 5 and 6, $R_9$, and $R_{10}$ are each independently —H, —$CH_3$, —$C_2H_5$, —$C_3H_7$, —$C_4H_9$, $C_5H_{11}$, a linear alkyl group having 6 to 8 carbon atoms, or a branched alkyl group having 3 to 8 carbon atoms.

2. A display device comprising a first display, wherein the first display includes:
   a first substrate;
   a first electrode on the first substrate;
   a second electrode on the first electrode;
   a second substrate on the second electrode; and
   a liquid crystal layer disposed between the first electrode and the second electrode,
   the liquid crystal layer includes a liquid crystal and a black dye,
   the black dye includes at least one a first black dye, a second black dye, or a third black dye,
   the first black dye is a compound in which three naphthalene rings are connected via two azo groups,
   the second black dye is a compound in which two naphthalene rings and one aromatic group are connected via two azo groups, and
   the third black dye is a compound in which three naphthalene rings and one aromatic group are connected via three azo groups,
   wherein the first black dye is represented Formula 1, 2, or 3:

Formula 1

Formula 2

Formula 3 where, in Formula 1, 2, and 3, $R_1$, $R_2$, $R_3$, $R_4$, and $R_5$ are each independently —H, —$CH_3$, —$C_2H_5$, —$C_3H_7$, —$C_4H_9$, $C_5H_{11}$, a linear alkyl group having 6 to 8 carbon atoms, or a branched alkyl group having 3 to 8 carbon atoms.

3. A display device comprising a first display, wherein the first display includes:
   a first substrate;
   a first electrode on the first substrate;

a second electrode on the first electrode;
a second substrate on the second electrode; and
a liquid crystal layer disposed between the first electrode and the second electrode,
the liquid crystal layer includes a liquid crystal and a black dye,
the black dye includes at least one a first black dye, a second black dye, or a third black dye,
the first black dye is a compound in which three naphthalene rings are connected via two azo groups,
the second black dye is a compound in which two naphthalene rings and one aromatic group are connected via two azo groups, and
the third black dye is a compound in which three naphthalene rings and one aromatic group are connected via three azo groups,
wherein the third black dye is represented by Formula 7 or 8:

Formula 7

Formula 8 where, in Formulas 7 and 8, $R_{11}$ and $R_{12}$ are each independently —H, —$CH_3$, —$C_2H_5$, —$C_3H_7$, —$C_4H_9$, $C_5H_{11}$, a linear alkyl group having 6 to 8 carbon atoms, or a branched alkyl group having 3 to 8 carbon atoms.

4. The display device of claim 1, further comprising:
a second display on the first display,
wherein the second display is a transparent display.

5. The display device of claim 1,
wherein the liquid crystal layer further comprises a reactive initiator, an acrylic monomer, and a urethane-acrylic oligomer.

6. The display device of claim 1,
wherein an amount of the black dye is 0.01 wt % to 10 wt % with respect to the liquid crystal.

7. The display device of claim 1, further comprising:
a first insulating layer between the first electrode and the liquid crystal layer; and
a second insulating layer between the second electrode and the liquid crystal layer.

8. The display device of claim 3, further comprising:
a second display on the first display,
wherein the second display is a transparent display.

9. The display device of claim 3,
wherein the liquid crystal layer further comprises a reactive initiator, an acrylic monomer, and a urethane-acrylic oligomer.

10. The display device of claim 3,
wherein an amount of the black dye is 0.01 wt % to 10 wt % with respect to the liquid crystal.

11. The display device of claim 3, further comprising:
a first insulating layer between the first electrode and the liquid crystal layer; and
a second insulating layer between the second electrode and the liquid crystal layer.

12. The display device of claim 2, further comprising:
a second display on the first display,
wherein the second display is a transparent display.

13. The display device of claim 2,
wherein the liquid crystal layer further comprises a reactive initiator, an acrylic monomer, and a urethane-acrylic oligomer.

14. The display device of claim 2,
wherein an amount of the black dye is 0.01 wt % to 10 wt % with respect to the liquid crystal.

15. The display device of claim 2, further comprising:
a first insulating layer between the first electrode and the liquid crystal layer; and
a second insulating layer between the second electrode and the liquid crystal layer.

* * * * *